(12) United States Patent
Yamada

(10) Patent No.: US 12,140,673 B2
(45) Date of Patent: *Nov. 12, 2024

(54) FREQUENCY SHIFT LIGHT MODULATOR AND LASER DOPPLER MEASURING DEVICE

(71) Applicant: SEIKO EPSON CORPORATION, Tokyo (JP)

(72) Inventor: Kohei Yamada, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 19 days.

This patent is subject to a terminal disclaimer.

(21) Appl. No.: 18/089,724

(22) Filed: Dec. 28, 2022

(65) Prior Publication Data

US 2023/0130013 A1 Apr. 27, 2023

Related U.S. Application Data

(63) Continuation of application No. 16/830,569, filed on Mar. 26, 2020, now Pat. No. 11,609,331.

(30) Foreign Application Priority Data

Mar. 28, 2019 (JP) .................... 2019-064313

(51) Int. Cl.
*G01C 3/08* (2006.01)
*G01S 7/484* (2006.01)
*G01S 7/4861* (2020.01)
*G01S 7/499* (2006.01)
*G01S 17/58* (2006.01)

(52) U.S. Cl.
CPC .............. *G01S 17/58* (2013.01); *G01S 7/484* (2013.01); *G01S 7/4861* (2013.01); *G01S 7/499* (2013.01)

(58) Field of Classification Search
CPC ........ G01S 17/58; G01S 7/484; G01S 7/4861; G01S 7/499
See application file for complete search history.

(56) References Cited

U.S. PATENT DOCUMENTS 3,259,014 A * 7/1966 Johnson ................. G02B 26/02
359/263
4,786,124 A 11/1988 Stone et al.
(Continued)

FOREIGN PATENT DOCUMENTS

CN 101166947 B * 5/2010 ............. G01S 17/34
CN 105811236 A 7/2016
(Continued)

*Primary Examiner* — Mark Hellner
(74) *Attorney, Agent, or Firm* — Harness, Dickey & Pierce, P.L.C.

(57) ABSTRACT

A frequency shift light modulator includes a resonator and a diffraction grating including a plurality of grooves arranged in parallel in a displacement direction of the resonator, and the diffraction grating is provided on the resonator. By providing the diffraction grating on the resonator, it is easy to realize miniaturization and increase in accuracy of the frequency shift light modulator. Further, it is easy to realize application to a high frequency region in a MHz band, that is, high frequency modulation. It is possible to efficiently obtain an effect based on a combination of the resonator and the diffraction grating.

6 Claims, 5 Drawing Sheets

(56) References Cited

U.S. PATENT DOCUMENTS

| | | | |
|---|---|---|---|
| 5,114,226 A | 5/1992 | Goodwin et al. | |
| 11,609,331 B2 * | 3/2023 | Yamada | ................... G01S 7/499 |
| 2006/0227316 A1 | 10/2006 | Gatt | |
| 2019/0331797 A1* | 10/2019 | Singer | ..................... G01S 7/497 |

FOREIGN PATENT DOCUMENTS

| | | | | |
|---|---|---|---|---|
| JP | S54-002092 A | 1/1979 | | |
| JP | H01-214279 A | 8/1989 | | |
| JP | H02-038889 A | 2/1990 | | |
| JP | H09-054293 A | 2/1997 | | |
| JP | 2002-350342 A | 12/2002 | | |
| JP | 2007-285898 A | 11/2007 | | |
| JP | 2010-283089 A | 12/2010 | | |
| JP | 2011187947 A | 9/2011 | | |
| JP | 2015-180137 A | 10/2015 | | |
| JP | 2017-135314 A | 8/2017 | | |
| KR | 20110018298 A | * | 2/2011 | ........... G01S 7/4818 |

\* cited by examiner

FREQUENCY SHIFT LIGHT MODULATOR AND LASER DOPPLER MEASURING DEVICE

This application is a continuation of U.S. patent application Ser. No. 16/830,569 filed Mar. 26, 2020, which claims priority from Japan Patent Application No. 2019-064313, filed Mar. 28, 2019, the disclosure of which is hereby incorporated by reference herein in its entirety.

BACKGROUND

1. Technical Field

The present disclosure relates to a frequency shift light modulator and a laser Doppler measuring device for grasping a motion state of a moving object.

2. Related Art

JP-A-2007-285898 is an example of the related art regarding this type of frequency shift light modulator and laser Doppler measuring device. JP-A-2007-285898 discloses that a shift amount of frequency is obtained using a heterodyne interference.

Specifically, in paragraph [0028] of the description, it is described that "For a resonator element, it is desirable to use a piezo element that has a property of being deformed when, for example, a voltage, a magnetization, or the like is applied, and whose resonance frequency is variable by changing the voltage. Further, the resonance frequency is required to be a triangular wave or a sawtooth wave whose waveform rises linearly. A light Doppler shift is used which is caused by incidence of laser light when a sawtooth wave applied voltage rises or when a triangular wave applied voltage rises and falls."

However, in general, a resonator element such as a quartz crystal resonator or a Si resonator uses a simple resonance drive having a very high Q value indicating sharpness of oscillation, and the driving method described therein may not be accurate and realistic. Further, there is no description or suggestion about application to resonance in a high frequency in a MHz band, that is, high frequency modulation.

SUMMARY

The present disclosure is directed to a frequency shift light modulator that includes a plate-shaped resonator that repeats a mode, by applying a potential, in which a crystal is distorted and resonates in a direction along a plane; and a diffraction grating that is provided on a surface of the resonator and that includes a plurality of linear grooves arranged periodically.

DESCRIPTION OF EXEMPLARY EMBODIMENTS

Figure 1:
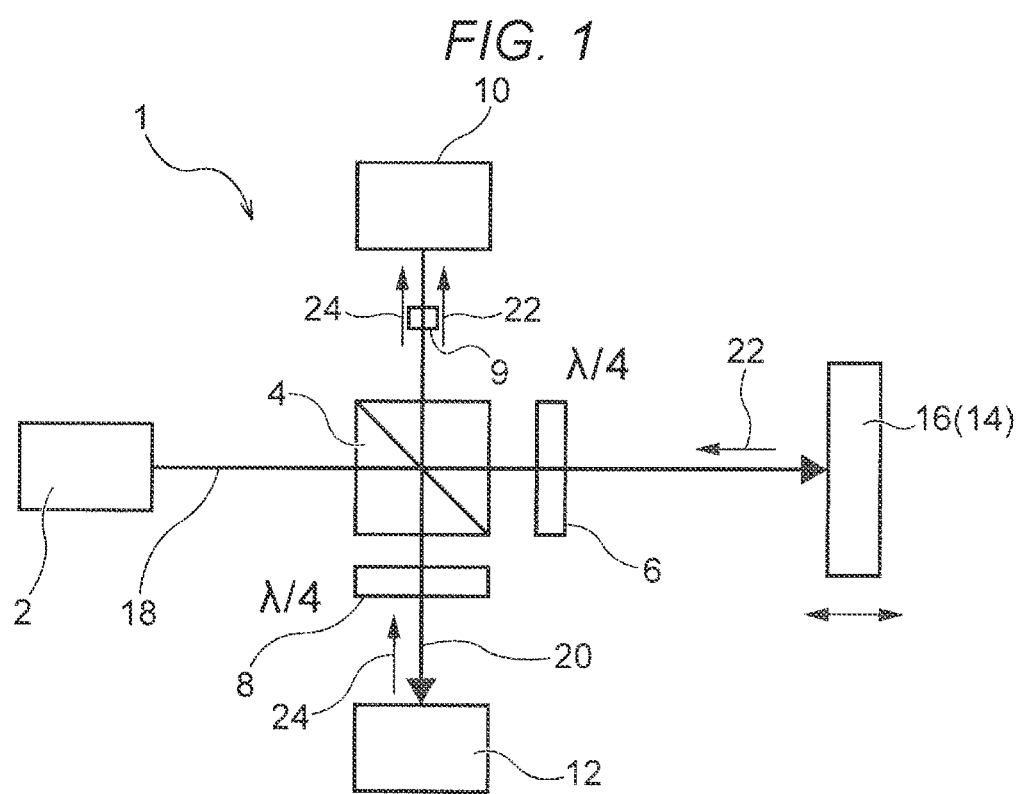
FIG. 1 is a schematic configuration diagram of a laser Doppler measuring device according to an embodiment of the present disclosure.

First, the present disclosure will be schematically described.

A frequency shift light modulator according to a first aspect of the present disclosure for solving the above problem includes a resonator and a diffraction grating including a plurality of grooves arranged in parallel in a displacement direction of the resonator, and the diffraction grating is provided on the resonator.

According to this aspect, the diffraction grating is provided on the resonator, so that it is easy to realize miniaturization and increase in accuracy of the frequency shift light modulator. Further, it is easy to realize application to a high frequency region in a MHz band, that is, high frequency modulation.

Further, in a case in which the frequency can be modulated, diffracted light can have a larger modulation frequency when the resonator resonates in a grating vector direction.

According to this aspect, since in the plurality of grooves, an extending direction of the groove intersects a direction of the resonance, it is possible to efficiently obtain an effect based on a combination of the resonator and the diffraction grating, and thus it is possible to easily realize high frequency modulation of the frequency shift light modulator.

According to a second aspect of the present disclosure, in the frequency shift light modulator according to the first aspect, the diffraction grating is a blazed diffraction grating.

According to this aspect, since the diffraction grating is the blazed diffraction grating, it is possible to increase light use efficiency, and thus it is possible to easily realize the miniaturization and increase in SN of the frequency shift light modulator.

According to a third aspect of the present disclosure, in the frequency shift light modulator according to the first aspect or the second aspect, the resonator is a quartz crystal AT resonator that performs thickness-shear resonance in the high frequency region in the MHz band.

According to this aspect, since the resonator is the quartz crystal AT resonator that performs the thickness-shear resonance in the high frequency region in the MHz band, it is possible to easily realize the miniaturization, the increase in accuracy, and further the high frequency modulation of the frequency shift light modulator.

A laser Doppler measuring device according to a fourth aspect of the present disclosure includes: a light source unit that outputs laser light of a predetermined wavelength; a polarization beam splitter; a plurality of λ/4 plates; an analyzer; a light receiving element that converts light into an electrical signal; the frequency shift light modulator according to the first aspect; and a set unit of a to-be-measured object. The polarization beam splitter, the λ/4 plate, and the set unit are disposed on an optical axis of the laser light output from the light source unit. The λ/4 plate and the frequency shift light modulator are disposed on an optical axis of laser light reflected by the polarization beam splitter. The analyzer is disposed between the polarization beam splitter and the light receiving element. Doppler shift light reflected from the to-be-measured object and frequency shift light reflected by the frequency shift light modulator is guided to the light receiving element passing through the λ/4 plates, the polarization beam splitter and the analyzer.

According to this aspect, since the frequency shift light modulator described in the first aspect is provided in the laser Doppler measuring device, it is possible to easily realize miniaturization, increase in accuracy, and high frequency modulation of the laser Doppler measuring device.

According to a fifth aspect of the present disclosure, in the laser Doppler measuring device according to the fourth aspect, the frequency shift light is diffracted light of ±1st order.

According to this aspect, the frequency shift light modulator is disposed such that the diffracted light of ±1st order is used as the frequency shift light, so that it is possible to realize the miniaturization and high stability of the measuring device.

According to a sixth aspect of the present disclosure, in the laser Doppler measuring device according to the fourth aspect, the frequency shift light is any beam of diffracted light of ±2nd order or more.

According to this aspect, since the frequency shift light modulator is disposed such that any beam of the diffracted light of ±2nd order or more is used as the frequency shift light, it is possible to realize the miniaturization and high frequency modulation of the measuring device.

According to a seventh aspect of the present disclosure, in the laser Doppler measuring device according to the fifth aspect or the sixth aspect, the frequency shift light modulator is disposed such that an entering direction of the laser light to the frequency shift light modulator and a traveling direction of the frequency shift light reflected from the frequency shift light modulator form an angle of 180 degrees.

Here, the "angle of 180 degrees" in "the frequency shift light modulator is disposed such that an entering direction of the laser light to the frequency shift light modulator and a traveling direction of the frequency shift light reflected from the frequency shift light modulator form an angle of 180°" may be formed when reflection is performed using a mirror or when a plane formed by the diffraction grating is disposed to tilt without using a mirror.

According to this aspect, when the "angle of 180 degrees" is formed by using a mirror, modulated light is subjected to Doppler shift twice, and it is possible to realize higher frequency modulation. Further, when the "angle of 180 degrees" is formed without using a mirror, the mirror is not necessary, so that it is possible to realize further miniaturization.

Subsequently, the frequency shift light modulator and the laser Doppler measuring device according to an embodiment of the present disclosure will be described with reference to FIGS. 1 to 5. In the drawings, the same components are denoted by the same reference numerals, and the individual descriptions of the respective drawings are omitted.

Embodiment

Laser Doppler Measuring Device

A configuration of a laser Doppler measuring device 1 according to an embodiment of the present disclosure will be described with reference to FIG. 1.

The laser Doppler measuring device 1 according to the present embodiment includes a light source unit 2 that outputs laser light of a predetermined wavelength, a polarization beam splitter 4, two λ/4 plates 6 and 8, an analyzer 9, a light receiving element 10 that converts light into an electrical signal, a frequency shift light modulator 12, and a set unit 16 of an to-be-measured object 14. The polarization beam splitter 4, the λ/4 plates 6, and the set unit 16 are disposed in this order on an optical axis 18 of the light emitted from the light source unit 2. On the other hand, the λ/4 plate 8 and the frequency shift light modulator 12 are disposed in this order on an optical axis 20 of light reflected by the polarization beam splitter 4. The analyzer 9 is disposed between the polarization beam splitter 4 and the light receiving element 10.

Further, Doppler shift light 22 reflected from the to-be-measured object 14 and frequency shift light 24 reflected by the frequency shift light modulator 12 are guided to the light receiving element 10 passing through the λ/4 plates 6 and 8, the polarization beam splitter 4, and the analyzer 9.

Further, the polarization beam splitter may be used as a non-polarization beam splitter. In this case, the λ/4 plate is not necessary, and the number of components is reduced, so that it is possible to realize further miniaturization. Further, when stability of interference is degraded, it is preferable to design the frequency shift light modulator 12 in view of the degradation.

Light Source Unit

Since coherency is necessary for the light source unit 2, a laser light source in the MHz band with a narrow line width is used. Specifically, examples of the light source unit 2 include a gas laser represented by a HeNe laser; and a DFB-LD and a VCSEL which are semiconductor lasers that are easy to miniaturize.

Polarization Beam Splitter

In the present embodiment, the polarization beam splitter 4 is configured with P-polarization transmission and S-polarization reflection. The laser light output from the light source unit 2 is incident on a center of the polarization beam splitter 4 on the optical axis 18 with a ratio of P-polarization to S-polarization being 50%:50%. In the P-polarization, light passes through the polarization beam splitter 4 and is directed toward the λ/4 plate 6 on the optical axis 18. On the other hand, in the S-polarization, light is reflected by the polarization beam splitter 4 and is directed toward the λ/4 plate 8 on the optical axis 20.

λ/4 Plate

The P-polarized light passes through the λ/4 plate 6 and is circularly polarized, and the moving to-be-measured object 14 is irradiated with the circularly polarized light. The laser light by which the moving to-be-measured object 14 is irradiated is reflected as the Doppler shift light 22 Doppler shifted only by fd (Hz), passes through the λ/4 plate 6 again and is S-polarized.

On the other hand, the S-polarized light that is reflected by the polarization beam splitter 4 and that is directed toward the λ/4 plate 8 on the optical axis 20 passes through the λ/4 plate 8, is circularly polarized, and is incident on the frequency shift light modulator 12. The laser light incident on the light modulator 12 is reflected as the frequency shift light 24 that is subject to frequency shift fm, passes through the λ/4 plate 8 again, and is P-polarized.

Analyzer

Since orthogonal polarized light is independent of each other, the interference does not appear by only simply superimposing the polarized light. Here, a light wave synthesized in this way passes through the analyzer 9 tilted at 45 degrees with respect to the both polarized light, and then is detected by the light receiving element 10. Thus, the polarized light is brought into a state in which components are common to each other, which can cause an interference phenomenon.

Light Receiving Element

The Doppler shift light 22 Doppler shifted by the moving to-be-measured object 14 and the frequency shift light 24 frequency-shifted by the frequency shift light modulator 12 is guided to the light receiving element 10 through the polarization beam splitter 4 and the analyzer 9. In the light receiving element 10, the Doppler shift light 22 and the frequency shift light 24 is interfered (optical heterodyne interference), and light having a frequency of fm-fd is generated. Based on the light having the frequency of fm-fd, it is possible to obtain a motion of the to-be-measured object 14, that is, speed and resonance thereof. A photodiode or the like can be used as the light receiving element 10.

Frequency shift Light Modulator

A configuration of the frequency shift light modulator 12 according to the embodiment of the present disclosure will be described with reference to FIG. 2.

The frequency shift light modulator 12 includes a plate-shaped resonator 30 that repeats a mode, by applying a potential, in which a crystal is distorted and resonates in a direction along a plane of the resonator; and a diffraction grating 34 that is provided on a surface of the resonator 30 and that includes a plurality of linear grooves 32 arranged periodically. In FIG. 2, the reference numeral 31 denotes a substrate to which the resonator is attached, a pad 33 is provided on the substrate 31, and further, a pad 35 is provided on a back surface of the substrate 31.

In the present embodiment, as for a dimension and shape of the substrate 31, the substrate 31 is square with one side of 1.6 mm and a thickness of 0.35 mm. The resonator 30 is square with one side of 1 mm and a thickness of 0.07 mm, and oscillates at 24 MHz. Although an example of the resonator having a basic oscillation frequency of 24 MHz is shown here, the basic oscillation frequency can be adjusted from 1 MHz to 300 MHz by changing the thickness of the resonator. The diffraction grating 34 has a pitch of 1 µm and a blazed angle of 25 degrees, and is provided on an entire surface of the resonator 30. The diffraction grating 34 may be provided only on a part of the surface of the resonator 30 but not the entire surface.

In the present embodiment, the resonator 30 is a quartz crystal AT resonator that performs thickness-shear resonance in a high frequency region in a MHz band. Further, the diffraction grating 34 is a blazed diffraction grating. The blazed diffraction grating refers to a diffraction grating having a stepped cross-sectional shape.

Figure 2:
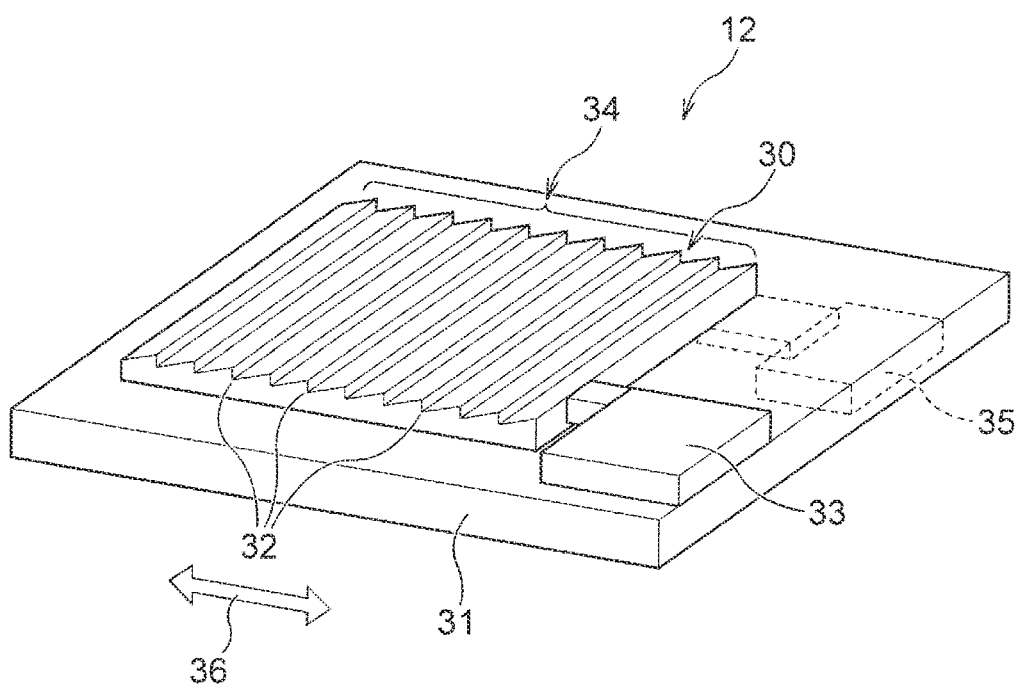
FIG. 2 is a schematic perspective view of a frequency shift light modulator according to the embodiment.

As shown in FIG. 2, the linear grooves 32 of the diffraction grating 34 are provided such that a direction of the straight line is orthogonal to a direction 36 of the resonance of the resonator 30.

Method for Forming Diffraction Grating

An example of a method for forming the diffraction grating 34 includes a method in which a mold is first formed by a method using mechanical engraving (looping engine), and then the diffraction grating 34 is formed on an electrode of a chip of the quartz crystal AT resonator by nano-imprinting. Here, the reason why the diffraction grating 34 is formed on the electrode is that high-quality thickness-shear resonance can be generated on the electrode in principle when the resonator 30 is the AT resonator. The present disclosure is not limited to the electrode, and the diffraction grating 34 can also be formed on a non-electrode material surface. Further, it is also possible for an electrostatic drive type Si resonator, and a SAW device or the like to generate high quality in-plane resonance even on the non-electrode material surface, so that the formation location can be selected as appropriate. Further, the diffraction grating 34 can also be formed by a method of exposing or etching, electron light lithography, and focused ion beam processing (FIB), or the like.

Further, a metal film or a mirror film made of a dielectric multilayer film may be provided on a resist diffraction grating formed on the chip of the quartz crystal AT resonator, which is because reflectance of the diffraction grating 34 provided with the metal film or the mirror film increases.

The chip or wafer on which the resist diffraction grating is provided may be processed by dry etching to remove the resist, and then the mirror film may be provided. Therefore, effect of moisture absorption or the like due to the resist is eliminated, so that the stability of the diffraction grating 34 can be increased. Further, by making the mirror film a metal such as Au or Al, the resonator can also function as an oscillation electrode. Alternatively, a structure such as anodized alumina (porous alumina) may be used.

Modulation Frequency fm When Thickness-Shear Resonator Element is Used

Figure 3:
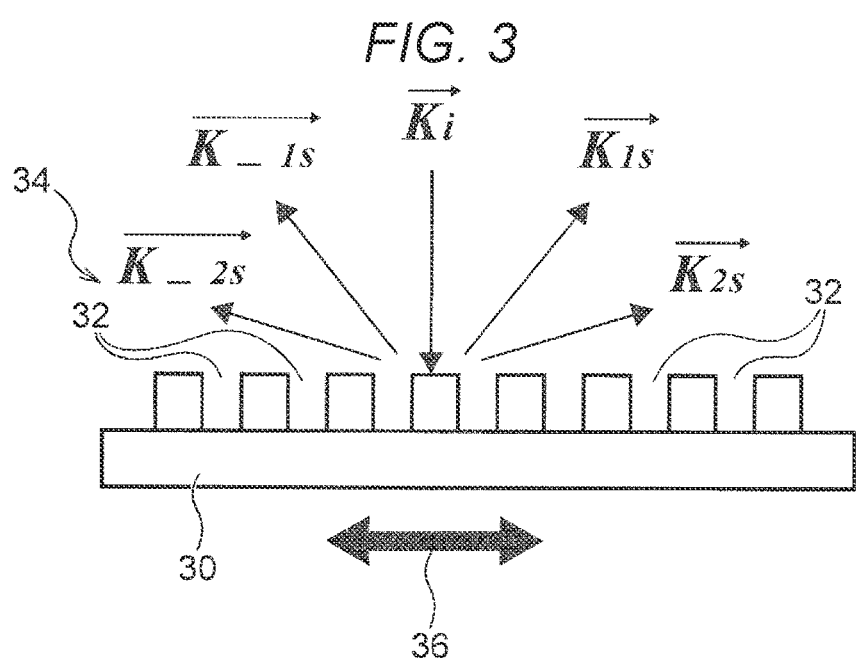
FIG. 3 is a diagram illustrating generation of a plurality of beams of diffracted light from incident light in the light modulator of the embodiment.

Modulated light is subject to Doppler shift and the frequency thereof is modulated. As shown in FIG. 3, according to the principle of the laser Doppler, a plurality of beams of diffracted light Kns are generated from incident light Ki incident on the diffraction grating 34 of the frequency shift light modulator 12. Here, n is the order of the diffracted light and n=0, ±1, ±2 . . . .

In FIG. 3, the diffraction grating 34 is not the blazed diffraction grating in FIG. 2, but a diffraction grating with repeated irregularities. In actual manufacturing, the order n of the diffracted light can be appropriately selected and used.

Although FIG. 3 shows a case in which the incident light Ki is incident from a direction perpendicular to the plane of the resonator 30, the present disclosure is not limited to a vertical incident angle, and the incident light Ki may be obliquely incident, that is, the incident angle may be set as appropriate. When the incident light Ki is obliquely incident, a direction of the diffracted light changes correspondingly.

In a design of the diffraction grating, light of higher order satisfying |n|≥2 may not appear. Therefore, it is desirable to set |n|=1 in order to obtain a stable modulation signal. That is, in the laser Doppler measuring device 1 of FIG. 1, the frequency shift light modulator 12 is preferably disposed such that diffracted light of ±1st order is used as the frequency shift light 24.

With this arrangement, it is possible to realize the miniaturization and high stability of the laser Doppler measuring device 1.

When light of a higher order satisfying |n|≥2 appears in the diffraction grating 34, the frequency shift light modulator 12 may be disposed such that any beam of the diffracted light of ±2nd order or more is used as the frequency shift light 24 in the laser Doppler measuring device 1 of FIG. 1.

Therefore, since the diffracted light of high order can be used, it is possible to realize high frequency modulation and the miniaturization of the laser Doppler measuring device 1.

In the present embodiment, the frequency shift light modulator 12 is disposed such that an entering direction of the laser light to the frequency shift light modulator 12 and a traveling direction of the frequency shift light 24 reflected from the frequency shift light modulator 12 form an angle of 180 degrees.

Figure 4:
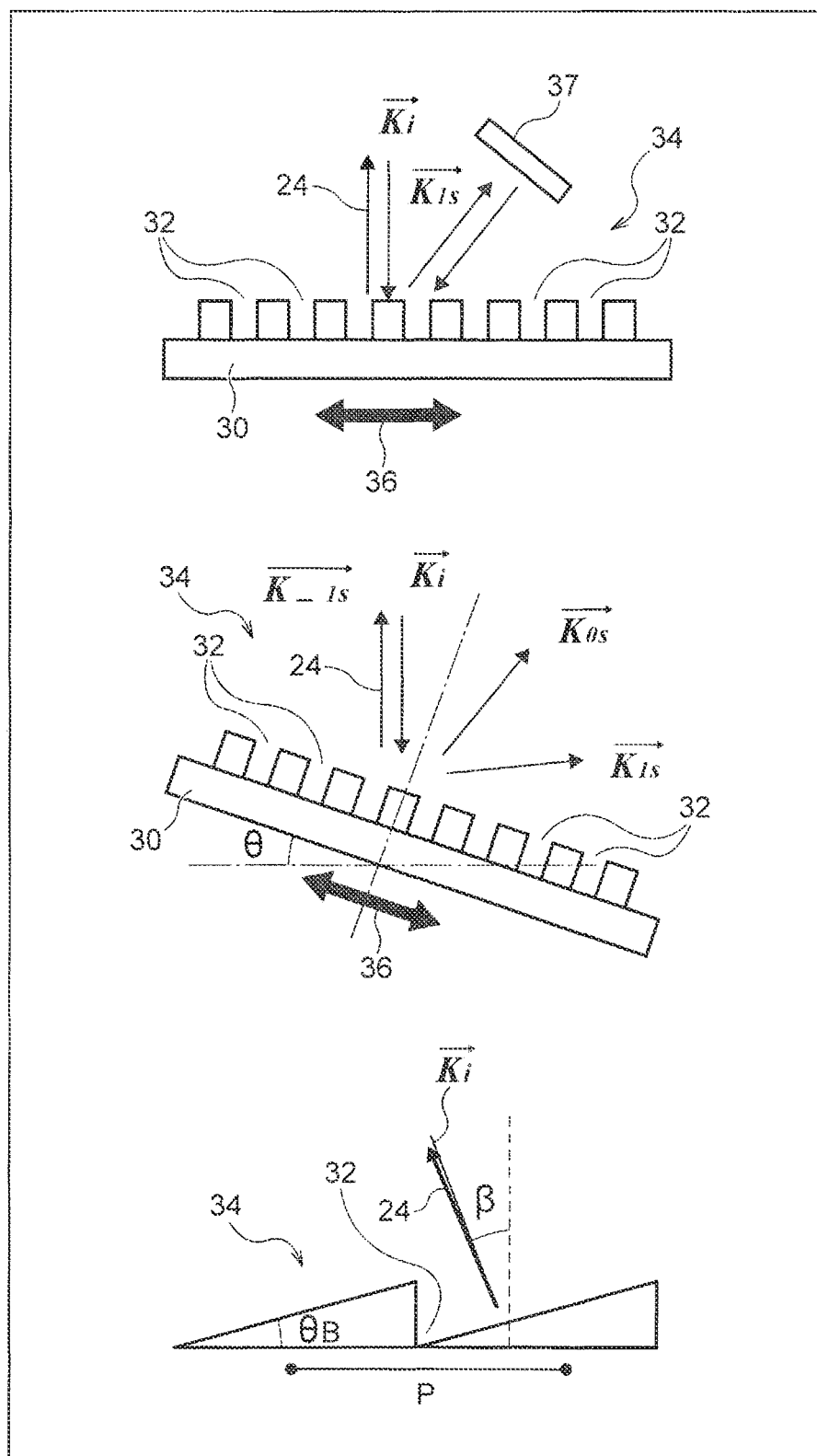
FIG. 4 illustrates light paths of the incident light and diffracted light in the light modulator of the embodiment.

A diagram at an upper side of FIG. 4 is a case in which a mirror 37 is used to form the angle of 180 degrees.

A diagram at a center of FIG. 4 corresponds to a case in which the resonator 30 is provided to tilt so as to form the angle of 180 degrees.

A diagram at a lower side of FIG. 4 is a case in which the diffraction grating 34 is a blazed diffraction grating, and a blazed angle $\theta_B$ is used to form the angle of 180 degrees. The angle of 180 degrees is formed by a combination of the blazed angle $\theta_B$ and an incident angle $\beta$ of the incident light Ki.

Therefore, when the "angle of 180 degrees" is formed by using a mirror 37, the modulated light is subjected to Doppler shift twice, and it is possible to realize higher frequency modulation.

Further, when the "angle of 180 degrees" is formed by tilting the resonator 30 without using the mirror, since the mirror is not necessary, it is possible to realize the further miniaturization.

When the diffraction grating 34 is a blazed diffraction grating, since the angle of 180 degree is formed by the combination of the blazed angle $\theta_B$ and the incident angle $\beta$ of the incident light Ki, it is possible to further realize the miniaturization and the high frequency modulation.

Mounting Structure of Laser Doppler Measuring Device

Figure 5:
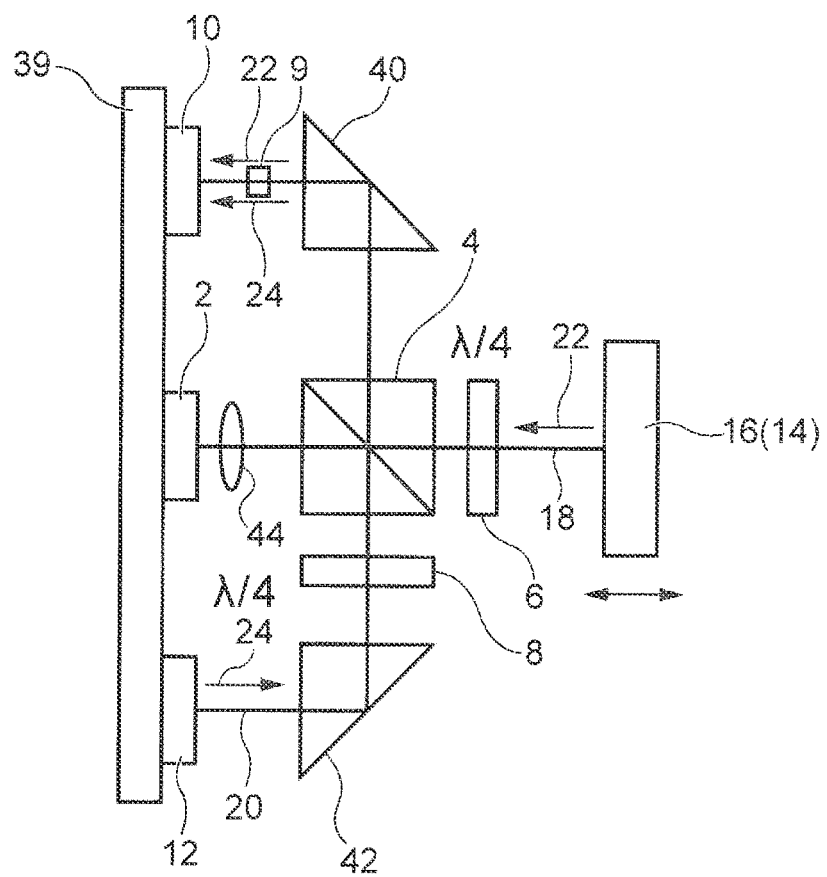
FIG. 5 is a schematic configuration diagram illustrating that a light source unit, a frequency shift light modulator, and a light receiving element are mounted on a base according to the embodiment.

FIG. 5 is a schematic configuration diagram illustrating that the light source unit 2, the frequency shift light modulator 12, and the light receiving element 10 are mounted on a base 39. In FIG. 5, the light source unit 2 is mounted at a center of the base 39, the frequency shift light modulator 12 is mounted at a lower position of the base 39, and the light receiving element 10 is mounted at an upper position of the base 39, but it is needless to say that the present disclosure is not limited to the arrangement.

Since the light source unit 2, the frequency shift light modulator 12, and the light receiving element 10 are mounted on the base 39, prisms 40 and 42 are provided on the optical axis 20. Further, a convex lens 44 is disposed between the light source unit 2 and the polarization beam splitter 4, and the light output from the light source unit 2 is effectively used.

In the mounting structure shown in FIG. 5, the light receiving element 10 is a photodiode having a square size of 0.1 mm, the light source unit 2 is a VCSEL light source having a square size of 10 μm, and the frequency shift light modulator 12 has a square size of 1 mm. As described above, it is possible to realize the miniaturization of the module up to a several mm square size.

Description of Effects of Embodiments

According to the present embodiment, the diffraction grating 34 is provided on the resonator 30, so that it is possible to realize the miniaturization and the increase in accuracy of the frequency shift light modulator 12. Further, it is possible to realize application to the high frequency region in the MHz band, that is, the high frequency modulation.

Further, the linear grooves 32 of the diffraction grating 34 have a configuration in which the direction of the straight line intersects the direction 36 of the resonance of the resonator 30, so that it is possible to efficiently obtain an effect based on the combination of the resonator 30 and the diffraction grating 34, and thus it is possible to easily realize the high frequency modulation of the frequency shift light modulator 12.

Further, in the present embodiment, the diffraction grating 34 is a blazed diffraction grating, so that it is possible to increase the light use efficiency, and thus it is possible to easily realize the miniaturization and the increase in SN of the frequency shift light modulator 12.

Further, in the present embodiment, the resonator 30 is the quartz crystal AT resonator that performs thickness-shear resonance in the high frequency region in the MHz band. Therefore, it is possible to easily realize the miniaturization, the increase in accuracy, and further the high frequency modulation of the frequency shift light modulator 12.

Furthermore, the laser Doppler measuring device of the present embodiment includes the frequency shift light modulator 12 according to the present embodiment, so that it is possible to easily realize the miniaturization, the increase in accuracy, and the high frequency modulation of the laser Doppler measuring device 1.

Other Embodiments

Although the frequency shift light modulator and the laser Doppler measuring device according to the present disclosure are basically configured as described above, it is possible to change or omit partial configuration without departing from the gist of the present disclosure.

In the above embodiment, for the diffraction grating 34, a case of using the quartz crystal AT resonator is described, but any element may be used as appropriate as long as the element can perform in-plane resonance such as the thickness-shear resonance. For example, in addition to the thickness-shear resonator element, examples of the resonator include an electrostatic drive type Si-MEMS resonator or a resonator using a piezoelectric element such as a piezo. Further, a surface acoustic wave resonator (SAW device) can also be used.

What is claimed is:

1. A frequency shift light modulator, comprising:
   a resonator configured to perform thickness-shear resonance in MHz band; and
   a diffraction grating provided on the resonator and including a plurality of grooves arranged in parallel,
   wherein the resonator is a quartz crystal resonator.

2. The frequency shift light modulator according to claim 1, wherein
   the diffraction grating is a blazed diffraction grating.

3. An optical heterodyne interferometer, comprising:
   a light source unit that outputs laser light of a predetermined wavelength;
   a light receiving element that converts light into an electrical signal;
   a frequency shift light modulator including a resonator, wherein
   Doppler shift light from a measurement object and frequency shift light reflected by the frequency shift light modulator is guided to the light receiving element, and
   the resonator is a quartz crystal resonator.

4. The optical heterodyne interferometer according to claim 3, wherein the frequency shift light is diffracted light of +1st order.

5. The optical heterodyne interferometer according to claim 3, wherein
   the frequency shift light is any beam of diffracted light of +2nd order or more.

6. The optical heterodyne interferometer according to claim 4, wherein
   the frequency shift light modulator is disposed such that an entering direction of the laser light to the frequency shift light modulator and a traveling direction of the frequency shift light reflected from the frequency shift light modulator form an angle of 180 degrees.

* * * * *